Dec. 27, 1955     H. L. MORRILL, JR     2,728,539
LANDING STRIP FOR AIRCRAFT
Filed May 21, 1954
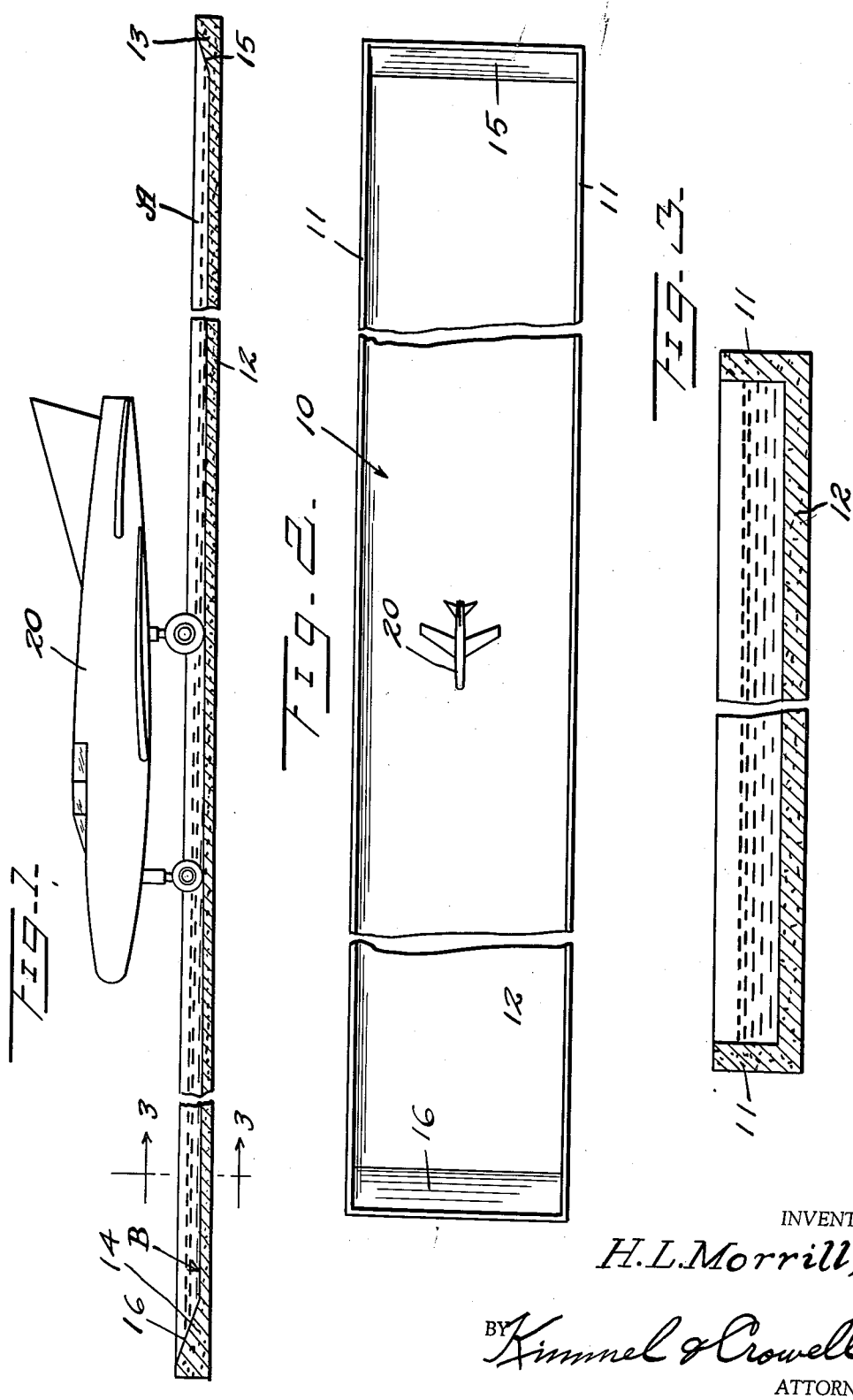
INVENTOR
*H. L. Morrill, Jr.*
BY *Kimmel & Crowell*
ATTORNEYS United States Patent Office 2,728,539
Patented Dec. 27, 1955

2,728,539

LANDING STRIP FOR AIRCRAFT

Harry L. Morrill, Jr., Atlanta, Ga.

Application May 21, 1954, Serial No. 431,318

2 Claims. (Cl. 244—114)

This invention relates to an improved landing strip or runway for aircraft.

As conducive to a clearer understanding of this invention, it may be here pointed out that present day landing strips for aircraft are customarily constructed with a hard smooth flat surface, and that due to the relatively high speed of modern aircraft when the wheels initially touch the runway, momentum of the aircraft exerts undue stress on the tires until the wheels have reached rotation commensurate with the speed of the aircraft. Frequently this occasions the blowing out of a tire because of the initial slippage and the excess heat at the time of initial contact with the runway.

Another object of this invention is, therefore to provide an improved runway which will substantially reduce the generation of heat on the tires when landing, and which will also provide a braking or retarding means for the aircraft and facilitate the complete stopping of the aircraft in a relatively short distance. This is effected by the construction of a runway normally covered by a film of water ranging in depth from an inch or less at the point of initial landing up to a desired depth along the length of the runway, the depth being occasioned to an extent by the maximum size of the aircraft, improved strip, and the length thereof.

Still other objects will in part be obvious and in part be pointed out as the description of the invention proceeds and shown in the accompanying drawing wherein there is disclosed a preferred embodiment of this inventive concept.

In the drawing:

Figure 1 is a side sectional view disclosing one form of runway embodying the instant invention, the inclination at the bottom thereof being exaggerated for the purpose of illustration.

Figure 2 is a top plan view of the runway on a reduced scale.

Figure 3 is a sectional view taken substantially along the line 3—3 of Figure 1, as viewed in the direction indicated by the arrows.

Similar reference characters refer to similar parts throughout the several views of the drawing.

Referring now to the drawing in detail, there is generally indicated at 10 a runway or landing strip which may be of any desired length and width in accordance with the type of aircraft to utilize the same, or local conditions, and which basically includes side walls 11, a concrete or other suitable water impervious bottom 12, and end walls 13 and 14, respectively.

Both end walls 13 and 14 are provided with inclined surfaces or ramps 15 and 16, respectively, converted toward the interior of the runway in the event that upon either premature landing or overshooting of the plane there will be no abrupt surface to impede the proper landing of the aircraft.

As will best be seen from consideration of Figure 1, the bottom 12 of the runway slopes in one direction from point A to a maximum depth at point B adjacent the end wall 14. The decrease is extremely gradual and at the point of initial landing the depth of the water is very slight and may be at the depth of an inch or even less.

At the time of initial impact, therefore, the water merely serves to cool the rim of the tires and affords no substantial abrupt reduction of the landing speed. However, as the depth of the water on the runway gradually increases initial frictional resistance is afforded to the wheels of the plane and such resistance effects a material lessening of the distance required for complete stoppage of the aircraft.

In the schematic drawing, a conventional aircraft of any desired type is generally indicated at 20 showing the position of the wheels of a normal tricycle landing gear.

From the foregoing it will now be seen that there is herein provided an improved runway or landing strip for aircraft, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. A landing strip for aircraft of the wheeled landing gear type, comprising a ground supported fluid-impervious tank including a bottom wall, a pair of side walls, and at least one end wall, said bottom wall having a slope in one direction throughout its length, said end wall having a slope in a direction opposite to the slope of said bottom wall to provide an exit ramp for said tank, said side walls and said end wall having the upper edges thereof flush with the surrounding ground surface, and a body of water in said tank having a gradual and progressive depth with its maximum depth adjacent said end wall, said water having a depth of approximately one inch in the shallow end of said tank, said body of water at the shallow end thereof serving as a lubricant during the initial impact of the landing wheels therewith, and co-acting with said wheels to progressively retard the passage of the aircraft.

2. A device as claimed in claim 1, wherein a second sloped end wall is provided to form an entry ramp into said tank at the shallow end thereof.

References Cited in the file of this patent

UNITED STATES PATENTS

| 2,433,238 | Ramirez | Dec. 23, 1947 |
| 2,466,150 | Burt | Apr. 5, 1949 |

FOREIGN PATENTS

| 1,048,485 | France | Aug. 5, 1953 |